Patented Aug. 31, 1943

2,328,355

UNITED STATES PATENT OFFICE 2,328,355

ANIMAL GROWTH PROMOTING SUBSTANCE

Jerome Jordan Oleson, Pearl River, N. Y., assignor to Lederle Laboratories, Inc., New York, N. Y., a corporation of Delaware No Drawing. Application June 20, 1941, Serial No. 398,916

15 Claims. (Cl. 99—11)

This invention relates to the vitamin and nutritional requirements of higher animals and more particularly relates to compositions comprising uracil carboxylic acids and derivatives thereof for stimulating the growth and improving the health of higher animals.

Considerable research has been carried out in the past few years on the use of vitamins in the nutrition of both man and animals for the purpose of improving their general health, prevention of disease, and in the treatment of vitamin and nutritional deficiency diseases. As a result of these extensive investigations it has become the practice to fortify various food products or combine various vitamins or vitamins and various mineral salts in pharmaceutical preparations for the purpose of supplementing the diets of man and animals in order to insure the nutritional and vitamin requirements of the animal food intake.

In accordance with the present invention I have discovered that uracil derivatives, particularly the uracil carboxylic acids, such as uracil-4-carboxylic acid, uracil-5-carboxylic acid, the amides and salts of said uracil carboxylic acids, have a vitamin-like activity in that they are growth promoting factors.

The uracil carboxylic acids may be prepared in a form suitable for use alone as a nutritional material or for incorporation in food stuffs, vitamin-containing or other pharmaceutical preparations by known processes. Uracil-4-carboxylic acid may be prepared by the method described by Behrend and Struve (Ann. 378, 167 (1910)). Uracil-5-carboxylic acid may be prepared by the method described by Wheeler, Johnson, and Johns (Am. Chem. J., 37, 400 (1907)) or by the method described by Wheeler and Johns (Am. Chem. J., 38, 600 (1907)). It has not been known heretofore, however, that the uracil carboxylic acids possessed the ability to stimulate the growth of animals or that they could be used in any way for supplying nutritional requirements.

In addition to the methods described in the literature for the preparation of uracil carboxylic acids I have found that uracil-5-carboxylic acid may be obtained in good yields by treating 5-methyl uracil with a 37% formalin solution and oxidizing the reaction product obtained.

I have also obtained uracil-5-carboxylic acid by hydrolyzing 5-cyano uracil.

The following specific examples of tests of the growth promoting effect of uracil carboxylic acids on chickens is given by way of illustration.

EXAMPLE 1

A purified basal chick ration containing all the known factors for chicks, except factor U and biotin, having the following composition: sucrose, 66%; casein, 18%; salt mixture, 5%; corn oil, 3%; gelatin, 5%; chondroitan, 2.5%; cholic acid, 0.25%; $MnSO_4$, 0.05%; choline, 0.2%; thiamin, 2.0 mg./kg.; riboflavin, 5.0 mg./kg.; pyridoxine, 5.0 mg./kg.; nicotinic acid, 10.0 mg./kg.; para-aminobenzoic acid, 50.0 mg./kg.; inositol, 50.0 mg./kg.; pantothenic acid, 3 mg./chick/day; tocopherol, 2 mg./chick three times a week; A and D concentrate, 2 drops/week; 2-methyl-1,4-naphthoquinone, 1 mg./kg.; grit, (ad lib.) as required; was used. Feeding experiments were conducted wherein control chickens were fed the purified basal ration and experimental chicks were fed the basal ration plus substances being tested for their growth promoting effect. The results of the feeding experiments are shown in Table I.

Table I

| | Ave. wt., grams |
|---|---|
| 1. Basal ration | 105 |
| 2. Basal ration plus 1 microgram biotin | 105 |
| 3. Same as 2 plus 10% yeast eluate | 150 |
| 4. Basal ration plus 10% yeast eluate plus 50 mg. uracil-5-COOH/kg | 250 |

An analysis of the results shows that biotin gives no results when fed at a level of 1 microgram/chick/day. Factor U (10% yeast eluate) gives a definite response but does not approach normal growth. However, when uracil-5-carboxylic acid was given in addition to factor U, a marked growth response was obtained approaching normal growth. This experiment, therefore, indicates that uracil-5-carboxylic acid is a factor which promotes the growth of chickens when added to the diet.

Example 2

Additional tests similar to those described in Example 1 were carried out using the same purified basal ration and the basal ration plus uracil-5-carboxylic acid and the basal ration plus uracil-4-carboxylic acid. The results of these tests are recorded in Table II.

*Table II*

| Supplement | Age, weeks | Ave. weight, grams |
|---|---|---|
| Control | 5 | 148 |
| 50 mg. uracil-5-COOH/1 kg | 5 | 189 |
| 50 mg. uracil-4-COOH/1 kg | 5 | 188 |
| Control | 3 | 93 |
| 50 mg. uracil-5-COOH/kg | 3 | 106 |
| 5 mg. uracil-5-COOH/kg | 3 | 108 |
| 50 mg. uracil-4-COOH/kg | 3 | 105 |
| 5 mg. uracil-4-COOH/kg | 3 | 116 |
| Control | 2 | 80 |
| 50 mg. uracil-4-COOH | 2 | 88 |
| Control plus 50 mg. each of uracil, divisine, isocytosine, 5-amino uracil, 4-amino uracil, 2,4-diamino-6-oxypyrimidine | | 91 |

An analysis of the results recorded in Table II shows conclusively that both uracil-5-carboxylic acid and uracil-4-carboxylic acid give a growth response in chicks receiving a highly purified diet.

In the foregoing examples uracil-5-carboxylic acid and uracil-4-carboxylic acid were used in the form of the free acids. It should be understood, however, that the acids can be replaced by the corresponding acid amides, the alkali metal, alkaline earth metal, or other salts of the acids. It has not been definitely determined how much of the uracil carboxylic acids or derivatives thereof is essential in the diet of the higher animals. In the tests on chicks it is seen that 5 micrograms give a growth response equivalent to 50 micrograms and it is reasonable to assume therefore that the amounts required may be quite small.

The uracil carboxylic acids and the derivatives thereof may be advantageously combined with carbohydrates, fats, proteins, minerals, and vitamins to produce a composition having a nutritional or vitamin value greater than such substances to which no uracil carboxylic acid or derivative has been added. In this connection the uracil carboxylic acids and derivatives thereof may be utilized for fortifying a wide variety of food stuffs comprising dairy products, such as milk and butter, vegetable and fruit products, cereal products, including breakfast foods, and the flour or meal to be used in bread making, as well as in yeast products. Similarly they may be used for incorporation in carbohydrate products, canned goods, and the like, as well as in protein and meat products. A number of food products are already in use wherein they have been fortified by the addition of mineral salts or vitamins or both mineral salts and vitamins. The uracil carboxylic acid and derivatives of this invention may be used for further improving the nutritional value of such compositions. The type of food product may very largely determine whether or not the uracil carboxylic acids should be used as the free acids or in the form of acid amides, salts, glucosides, etc. In various vegetable and fruit juices it may be more desirable to use the more readily soluble salts rather than the free acids.

The uracil carboxylic acids or derivatives thereof may be incorporated in various pharmaceutical preparations and particularly in pharmaceutical preparations containing vitamins. For example, the uracil carboxylic acids may be added to pharmaceutical preparations comprising the vitamin B complex or they may be used in conjunction with only one of any of the known vitamins or they may be used in conjunction with a single vitamin plus mineral salts or in compositions containing a plurality of vitamins and a plurality of mineral salts.

As growth promoting factors there may also be incorporated uracil, uracil glucosides, alkyl uracils, and amino uracils.

What I claim is:

1. The process of improving the animal nutritional requirements of substances of the group consisting of food products and pharmaceuticals which comprises adding thereto a substance of the group consisting of uracil-4-carboxylic acid, uracil-5-carboxylic acid, amides, glucosides and salts of such acids.

2. The process of improving the animal nutritional requirements of food products which comprises adding thereto a substance of the group consisting of uracil-4-carboxylic acid, uracil-5-carboxylic acid, amides, glucosides and salts of such acids.

3. The process of improving the animal nutritional requirements of pharmaceutical compositions which comprises adding thereto a substance of the group consisting of uracil-4-carboxylic acid, uracil-5-carboxylic acids, amides, glucosides and salts of such acids.

4. A composition comprising a food product and a substance of the group consisting of uracil-4-carboxylic acid, uracil-5-carboxylic acid, amides, glucosides and salts of such acids.

5. A composition comprising a vitamin containing preparation and a substance of the group consisting of uracil-4-carboxylic acid, uracil-5-carboxylic acid, amides, glucosides and salts of such acids.

6. A composition comprising a food product and the substance uracil-4-carboxylic acid.

7. A composition comprising a vitamin containing preparation and the substance uracil-4-carboxylic acid.

8. A composition comprising a food product and the substance uracil-5-carboxylic acid.

9. A composition comprising a vitamin containing preparation and the substance uracil-5-carboxylic acid.

10. An animal nutrient containing as the essential ingredient a substance of the group consisting of uracil-4-carboxylic acid, uracil-5-carboxylic acid, amides, glucosides and salts of such acids.

11. An animal nutrient containing as the essential ingredient uracil-4-carboxylic acid.

12. An animal nutrient containing as the essential ingredient uracil-5-carboxylic acid.

13. An animal nutrient composition comprising a yeast eluate and a substance of the group consisting of uracil-4-carboxylic acid, uracil-5-carboxylic acid, amides, glucosides and salts of such acids.

14. An animal nutrient composition comprising a yeast eluate and uracil-4-carboxylic acid.

15. An animal nutrient composition comprising a yeast eluate and uracil-5-carboxylic acid.

JEROME JORDAN OLESON.